Figure 1:
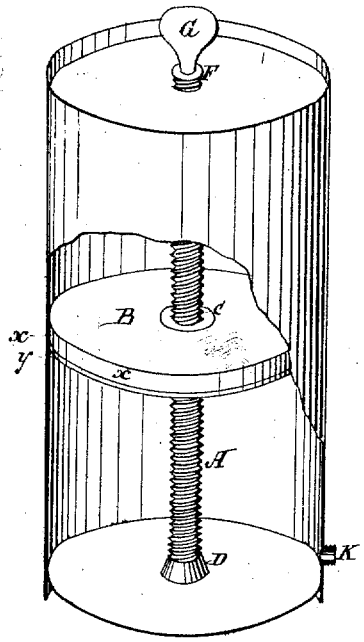

W. H. KING,

Assignor of one-half to F. O. PIERCE.

Can.

No. 9,585. Reissued Feb. 22, 1881.

WITNESSES:

J. A. Spooner

J. W. Bastedo

INVENTOR:

Wm. H. King

UNITED STATES PATENT OFFICE.

WILLIAM H. KING, OF BROOKLYN, NEW YORK, ASSIGNOR OF ONE-HALF TO FREDERICK O. PIERCE, OF SAME PLACE.

CAN.

SPECIFICATION forming part of Reissued Letters Patent No. 9,585, dated February 22, 1881.

Original No. 216,963, dated July 1, 1879. Application for reissue filed December 31, 1880.

*To all whom it may concern:*

Be it known that I, WILLIAM H. KING, of the city of Brooklyn, county of Kings, and State of New York, have invented a new and useful Improvement in Cans, of which the following is a specification.

This invention relates to that class of cans provided with pistons to expel their contents.

It consists in certain peculiarities of construction by which such cans are more easily constructed and less wasteful of the contents than those heretofore employed.

Previous to my invention a can had been made having a piston forced down by a screw working through a nut screwed into the head of the can. The body of this can has corners or ribs of such shape as would prevent the turning of the piston, and I do not therefore claim the idea of preventing the turning of the piston by the shape of the can. These corners, however, are objectionable, as solder is apt to accumulate on the ribs, and thus prevent the ready movement of the piston. The corners are also objectionable, because they are easily dented during the rough usage such cans experience, as are also the flat sides. These dents form obstacles to the passage of the piston, and it becomes jammed to one side, and thus the can becomes useless.

The method of operating the can is also objectionable, because when it is full, or nearly full, the screw projects out the whole length of the can, thus taking up much more room, and if laid away for any length of time dirt accumulates on the screw and makes it hard to turn.

To overcome these difficulties, I make the body of my can of oval shape, which prevents the piston from turning in the can, and yet it (the can) has neither corners nor flat sides, and I inclose my screw entirely inside the can, and provide it with a detachable key to turn it when the paint is to be forced out. The working of the screw by a key that can be detached and removed allows the paint to be inclosed air-tight at any time by simply removing the key and screwing on the cap, when the can may be stored away until again wanted. The removing of the key from its projecting position is of advantage in packing the cans.

The use of a can without ribs or corners is also best in an economic point of view, as such bodies are easier made than those having internal ribs or corners, and the same may be said of the pistons, especially when made of wood, which is the preferable material, as they can be readily turned in an oval-lathe all ready for use without any subsequent notching to fit the ribs, &c., which other forms of cans require.

The use of the ribs as a means of preventing the turning of the piston is, as a mode of construction, wasteful of the original material of which the can is composed, and it also wastes the material inclosed in the can, inasmuch as there is more surface to be covered by it, and in actual practice it is not easy to make pistons fit such ribs without having considerable space between the grooves and ribs, which allows of much of the paint in the can oozing through the grooves to the upper side of the piston, where it is wasted.

Figure 2:
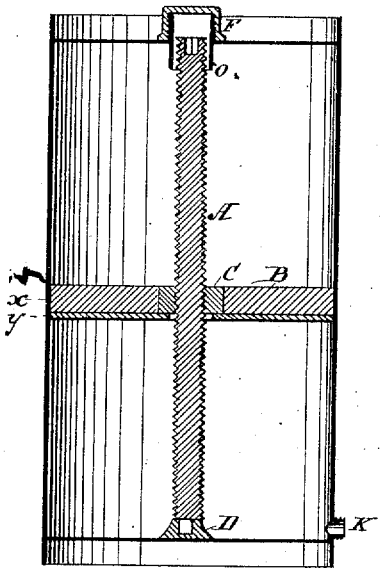
Figure 3:
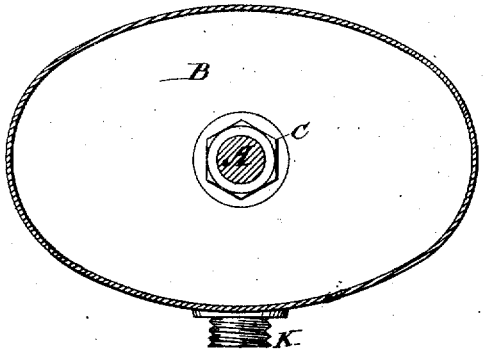

In the accompanying drawings, in which similar letters of reference indicate like parts, Figure 1 is a perspective of the can with a portion of the side cut away. Fig. 2 is a vertical cross-section of the same. Fig. 3 is a cross-section of the same.

A is the screw-shaft running through the center of the can or vessel, and held in position at O and D by means of a socket, collar, pivot, or other simple device, and yet not so rigidly as not to allow of its being revolved.

B is the diaphragm or disk, and C is the nut in the center of the same, through which the shaft A works, thus carrying the disk B downward or upward.

K is the orifice through which the contents of the can are removed, and over which a cap can be screwed, or the orifice otherwise closed when the can is not being used.

At F there is an opening in the head of the can or vessel, into which fits the top of the shaft A, to which a key or crank or other device may be applied to turn the shaft A. This opening may be closed by means of a cap or otherwise when the can is not in use.

G is the key or crank with which to revolve the shaft A.

When the can is full the disk B is close up under the head of the can, and between it and the contents of the can.

The operation of the device is as follows: The orifice K being opened, the key or crank G is applied to the screw-shaft at F and the latter is revolved. The shaft A, working through the nut C, carries downward the disk B, which, in turn, is forced down upon the contents of the can, and the latter are expelled through the orifice K.

If the vessel were made of a perfectly-cylindrical shape and the shaft were exactly in the true center, there would be a tendency to revolve the disk B around the shaft, instead of forcing it down by the screw. This tendency is avoided, while the economical method of construction is retained by making the shape of the vessel other than that of a true cylinder, such as oval.

My invention may be used in cans or vessels made of any material, as tin, glass, earthenware, &c.

I find that it is better to make the disk B of two parts, the upper portion, *x*, made of wood or other material, which will give strength to the disk and prevent it from being turned up at the edges by the resistance of the contents of the can, and the lower part, *y*, of a light flexible material, and slightly larger than the upper portion, so that when the disk is forced downward this lighter portion will completely fill whatever small space (arising from inequalities in the can or otherwise) there may happen to be between the periphery of the disk and the sides of the can, and thus prevent any of the contents of the can sticking to its sides. This lower portion must, of course, be made of such material as will not be injurious to the contents of the can, since it comes in immediate contact with the same. Thus, for paint, it may be oiled or shellaced paper or light pasteboard. This remark will also apply to the shaft A.

Another advantage in my invention is that as the disk B may be lowered or raised at will, when the can has once been emptied, it may be used over again by raising the disk to the head of the can and then refilling the same.

I am aware that lubricating devices have been provided with pistons operated by a screw-shaft; but there are essential differences in construction between the lubricators referred to and my can. A lubricator is not of such shape that the whole of its contents can be expelled by the movement of an interior piston; but, on the contrary, has a tube or nozzle screwed or otherwise fastened into one end, which is often of considerable size. Such a lubricator, having a guide-wire to prevent an interior piston from turning, is shown in the English patent of 1877, No. 392.

Such a paint-can as mine, especially when of large size, must have a flat bottom to permit it to stand upon a bench when the shaft is being turned to expel the contents, and so that the piston can be screwed down to the bottom; and it should have an orifice for permitting the escape of the contents in one side, substantially at the bottom, and thus all of the contents can be expelled. It should also be provided with a device for closing the discharge-orifice when the contents are not being expelled.

What I claim as my invention, and desire to secure by Letters Patent, is—

1. A can having an oval or equivalent-shaped body, in combination with a screw-shaft and similarly-shaped piston, substantially as and for the purpose set forth.

2. The combination of a detachable key, a revolving screw-shaft permanently set in fixed bearings, and a piston supported and propelled by said screw-shaft, with a can provided with an aperture in its head through which the screw and piston are operated by the detachable key, and a cap to close said aperture, whereby one key can be used for various cans and the can closed air-tight on the removal of of the key, substantially as specified.

3. The combination of a screw-shaft for propelling a piston with a can having its lower head provided with a step or bearing for the lower end of the shaft, and the other head having an aperture registering with said shaft, through which it may be operated, and a cap to cover up said aperture when the key is removed, substantially as specified.

4. A can or vessel provided with a discharge-orifice, K, and containing a screw-shaft, A, entirely inclosed between its heads, which screw-shaft passes through a piston, B, and is operated by means of a key or other device through the opening F, and is adapted to propel the piston from one end of the can to the other, the can being of such a shape as to prevent the piston turning in the same, and the whole rendered air-tight by means of caps over the openings F and K, substantially as and for the purpose set forth.

5. In a can having a piston and screw-shaft for expelling its contents, the combination of the following elements: first, a screw-shaft inclosed within the can and passing through the piston; second, a winding shank or stem outside of and at the end of said can for turning said shaft; and, third, a key or crank applied to said shank outside the end of the can, substantially as and for the purpose specified.

6. A can or vessel, with piston for expelling its contents, having the following characteristics: first, a flat bottom; second, an orifice (capable of being closed) for permitting escape of the contents, formed in the side and substantially at the bottom; third, a screw-shaft inclosed between the heads; fourth, a piston through which the screw-shaft passes and which is propelled from one end of the vessel to the other, and thus expels substantially all of the contents of the can, substantially as described.

7. A can for paint, &c., having the following characteristics: first, a screw-shaft passing through and inclosed within the can; second, a key or winding-stem outside said can;

third, a disk or piston having its upper portion of wood and its lower portion of a flexible material of a character not to injure the contents of the can and larger than the upper portion, to act as a scraper on the sides of the can, substantially as described.

8. A can for paints, &c., having the following characteristics: a disk fitting the inside of the can and adapted to be propelled from one end to the other by means of a screw-shaft passing through the same and entirely inclosed within the can, said can being unprovided with corners or devices additional to the sides of the can, to prevent the disk from turning in the can, substantially as described.

WM. H. KING.

Witnesses:
JOS. H. BASTERLO,
J. A. SPOONER.